United States Patent
Suh et al.

(10) Patent No.: US 9,190,672 B2
(45) Date of Patent: Nov. 17, 2015

(54) TUBULAR SOLID OXIDE FUEL CELL INCLUDING EXTERNAL CURRENT COLLECTOR WITH PLURALITY OF CONNECTION PORTIONS

(75) Inventors: Jun-Won Suh, Yongin-si (KR); Jan-Dee Kim, Yongin-si (KR); Young-Sun Kwon, Yongin-si (KR); Ho-Jin Kweon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 467 days.

(21) Appl. No.: 13/340,527

(22) Filed: Dec. 29, 2011

(65) Prior Publication Data

US 2013/0004880 A1    Jan. 3, 2013

(30) Foreign Application Priority Data

Jun. 30, 2011    (KR) .......................... 10-2011-0064414

(51) Int. Cl.
*H01M 8/02* (2006.01)
*H01M 8/24* (2006.01)

(52) U.S. Cl.
CPC .......... *H01M 8/0232* (2013.01); *H01M 8/0247* (2013.01); *H01M 8/243* (2013.01); *H01M 8/0252* (2013.01); *Y02E 60/50* (2013.01)

(58) Field of Classification Search
CPC .. H01M 8/0232; H01M 8/0247; H01M 8/243
USPC .................. 429/466, 497, 517, 522
See application file for complete search history.

(56) References Cited

U.S. PATENT DOCUMENTS

| | | | | |
|---|---|---|---|---|
| 5,229,224 A | * | 7/1993 | Ishihara et al. | 429/454 |
| 2007/0099065 A1 | * | 5/2007 | Rawson et al. | 429/40 |
| 2007/0141447 A1 | * | 6/2007 | Crumm et al. | 429/44 |
| 2007/0148523 A1 | | 6/2007 | Brown et al. | |
| 2009/0087741 A1 | * | 4/2009 | Ochi et al. | 429/206 |

FOREIGN PATENT DOCUMENTS

| | | |
|---|---|---|
| JP | 2008-140561 | 6/2008 |
| KR | 10-2006-0102667 A | 9/2006 |
| KR | 10-2009-0010918 A | 1/2009 |

OTHER PUBLICATIONS

KIPO Notice of Allowance dated Mar. 13, 2013 issued in priority Application No. 10-2011-0064414 (1 sheet).
Korean Office Action dated Sep. 27, 2012 issued in Korean Application No. 10-2011-0064414, 4 pages.

* cited by examiner

*Primary Examiner* — Sean P Cullen
(74) *Attorney, Agent, or Firm* — Christie, Parker & Hale, LLP

(57) ABSTRACT

A fuel cell including a plurality of tubular unit cells each including: a first electrode layer, an electrolyte layer, and a second electrode layer, stacked radially in a direction from a center axis to an outer region thereof; an internal current collector in an interior of the unit cell; and an external current collector arranged at an outer circumferential surface of the unit cell, the external current collector including a plurality of connecting portions configured to electrically connect between the unit cell and at least one another unit cell of the plurality of unit cells, and the connecting portions form two or more electrical paths between a unit cell of the plurality of unit cells and another unit cell of the plurality of unit cells.

11 Claims, 7 Drawing Sheets

| SECTION | NUMBER OF CONNECTING PORTIONS = 1 | NUMBER OF CONNECTING PORTIONS = 2 | NUMBER OF CONNECTING PORTIONS = 3 | REMARK |
|---|---|---|---|---|
| Bidir. | COMPARATIVE EXAMPLE 1 | EMBODIMENT 1-a | EMBODIMENT 2-a | 48% |
|  | 3.821 | 1.978 | 1.974 |  |
| Unidir. | COMPARATIVE EXAMPLE 2 | EMBODIMENT 1-b | EMBODIMENT 2-b | 46% |
|  | 23.36 | 12.54 | 12.53 |  |

| Unidir. | COMPARATIVE EXAMPLE 2 | EMBODIMENT 1-b | EMBODIMENT 2-b | REMARK |
|---|---|---|---|---|
| 15cm | 4.59 | 2.37 | 2.37 | 48% |
| 20cm | 7.64 | 3.96 | 3.96 | 48% |
| 30cm | 23.36 | 12.54 | 12.53 | 46% |
| 50cm | 37.42 | 19.57 | 19.56 | 48% |
| 100cm | 72.59 | 37.15 | 37.15 | 49% |
| 120cm | 130.66 | 66.87 | 66.87 | 49% |

| Unidir. | COMPARATIVE EXAMPLE 3 | EMBODIMENT 1-c | EMBODIMENT 2-c | REMARK |
|---|---|---|---|---|
| 15cm | 32.75 | 20.35 | 16.92 | 38% |
| 20cm | 54.59 | 33.91 | 28.20 | 38% |
| 30cm | 166.86 | 107.49 | 89.50 | 36% |
| 50cm | 267.29 | 167.74 | 139.71 | 37% |
| 100cm | 518.50 | 318.43 | 265.36 | 39% |
| 120cm | 933.30 | 573.17 | 477.64 | 39% |

TUBULAR SOLID OXIDE FUEL CELL INCLUDING EXTERNAL CURRENT COLLECTOR WITH PLURALITY OF CONNECTION PORTIONS

CROSS-REFERENCE TO RELATED APPLICATION

This application claims priority to and the benefit of Korean Patent Application No. 10-2011-0064414, filed on Jun. 30, 2011 in the Korean Intellectual Property Office, the entire content of which is incorporated herein by reference.

BACKGROUND

1. Field

Aspects of embodiments of the present invention relate to a fuel cell.

2. Description of the Related Art

Solid oxide fuel cells may be categorized as tubular solid oxide fuel cells and planar solid oxide fuel cells. Among these solid oxide fuel cells, the tubular solid oxide fuel cell has a slightly lower power density in a stack itself than the planar solid oxide fuel cell. However, the tubular solid oxide fuel cell has a similar power density in the entire system to the planar solid oxide fuel cell. The tubular solid oxide fuel cell is frequently used because of easy sealing between unit cells that constitute a stack, high resistance to heat stress, and high mechanical strength of the stack.

Tubular solid oxide fuel cells are classified into a cathode-supported fuel cell using a cathode as a support and an anode-supported fuel cell using an anode as a support. Recently, studies on solid oxide fuel cells have been conducted to develop anode-supported fuel cells. Wire made of silver (Ag) or the like is used as a current collector, and current is collected using a method of winding the wire around a cathode.

SUMMARY

According to an aspect of embodiments of the present invention, a fuel cell has a current collecting structure with improved current collection efficiency.

According to another aspect of embodiments of the present invention, a fuel cell equalizes or substantially equalizes a voltage distribution of a unit cell and decreases a voltage drop caused by resistance of a current collector itself.

According to another aspect of embodiments of the present invention, a fuel cell is capable of collecting current even when a disconnection occurs at a portion of a current collector.

According to an embodiment of the present invention, a fuel cell includes a first electrode layer, an electrolyte layer, and a second electrode layer, stacked radially in a direction from a center axis to an outer region thereof; an internal current collector in an interior of the unit cell; and an external current collector arranged at an outer circumferential surface of the unit cell, the external current collector including a plurality of connecting portions configured to electrically connect between the unit cell and at least one another unit cell of the plurality of unit cells, and the connecting portions form two or more electrical paths between a unit cell of the plurality of unit cells and another unit cell of the plurality of unit cells.

The connecting portions of the external current collector may be spaced apart at a predetermined interval.

The connecting portions may be arranged at both ends of the unit cell. The external current collector may include a metal including at least one of nickel (Ni) or silver (Ag).

A distance between the connecting portions of the external current collector may be 20 cm to 100 cm.

The connecting portions may include another connecting portion arranged at a central portion of the unit cell. The external current collector may include a metal including nickel (Ni). A length of the unit cell including the external current collector may be 20 cm to 100 cm.

Connecting portions may be arranged at both ends of the internal current collector.

According to an aspect of embodiments of the present invention, the voltage distribution of a unit cell may be equalized or substantially equalized, and the voltage drop caused by a current collector itself is decreased because the movement distance of electrons in the current collector is shortened.

According to another aspect of embodiments of the present invention, if a disconnection occurs at a portion of a current collector, electrons may move along another path such that continuous current collection is possible.

BRIEF DESCRIPTION OF THE DRAWINGS

The accompanying drawings, together with the specification, illustrate some exemplary embodiments of the present invention, and, together with the description, serve to explain principles of the present invention.

DETAILED DESCRIPTION

Figure 1:
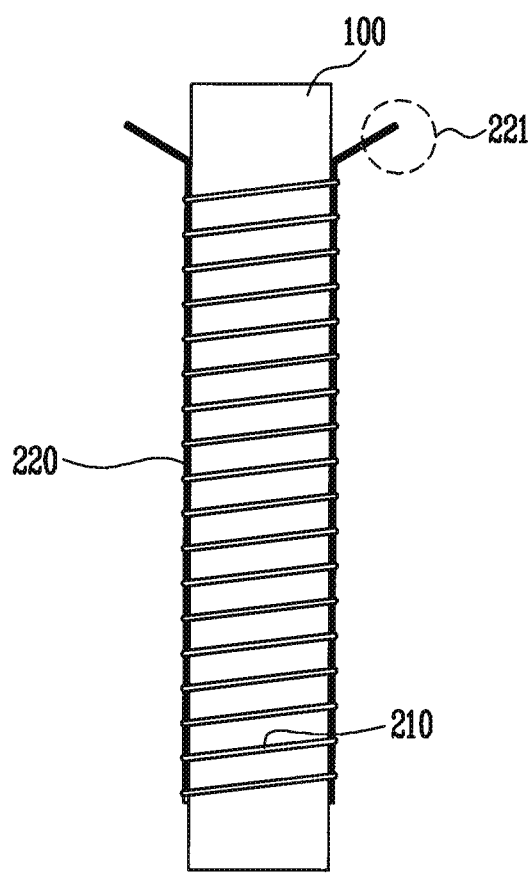
FIG. 1 is a schematic view showing a state that a single connecting portion is formed at an external current collector.

Some exemplary embodiments of the present invention will be described more fully hereinafter with reference to the accompanying drawings, by way of illustration; however, embodiments of the present invention may be embodied in different forms and should not be construed as limited to the exemplary embodiments illustrated and set forth herein. Rather, these exemplary embodiments are provided by way of example for understanding of the invention and to convey the scope of the invention to those skilled in the art. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Herein, the term "tubular unit cell" refers to a unit cell formed in a hollow pipe shape regardless of the shape of its cross section. That is, in the tubular unit cell, the sectional area in a vertical direction with respect to the center axis may be formed in various shapes, such as a circular shape or a polygonal shape.

A general fuel cell is composed of a fuel processor (a reformer and a reactor) for reforming and supplying fuel, and a fuel cell module. Here, the fuel cell module refers to an assembly including a fuel cell stack for converting chemical energy into electrical and thermal energy using an electrochemical method. That is, the fuel cell module includes a fuel cell stack, a piping system, a wire, and the like. The stack refers to a portion, as a group of unit cells, which converts chemical energy into electrical and thermal energy. The piping system refers to equipment in which fuel, oxide, coolant, discharge, and the like move. The wire refers to an electrical flow path along which electricity produced by the stack moves. In addition, the fuel cell module may include a portion for controlling or monitoring the stack, a portion for taking an action when an abnormal state of the stack occurs, and the like.

Three comparative experiments have been performed so as to describe respective embodiments of the present invention. Each of the comparative experiments is described herein together with its respective embodiment of the present invention.

Embodiments of the present invention relate to a structure of a unit cell and a current collector that is a portion for transferring electrons produced by an oxidizing reaction in the unit cell.

<Comparative Experiment 1>

The comparative experiment 1 is an experiment related to an anode-supported unit cell having a bidirectional internal current collector. The process of the experiment is described below in further detail.

Figure 2:
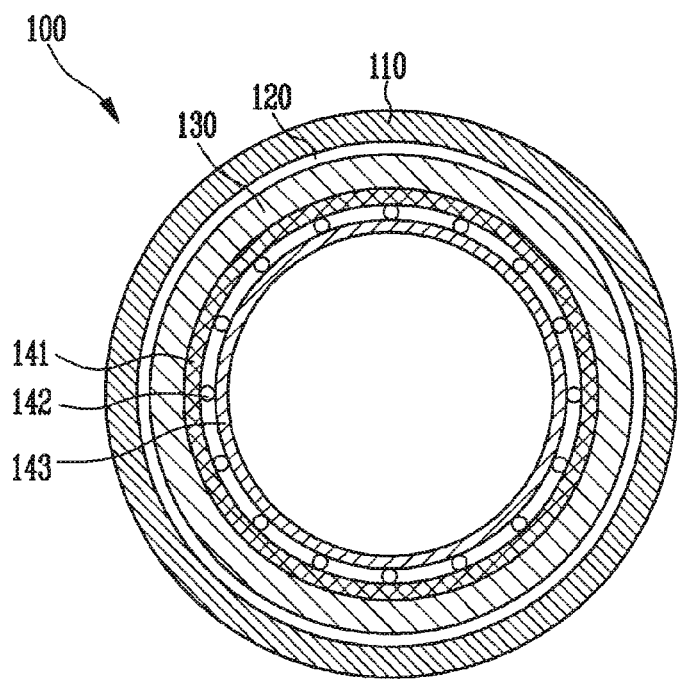
FIG. 2 is a cross-sectional view showing a structure of a tubular unit cell.

A unit cell 100 of a comparative example 1 will be described with reference to FIGS. 1 and 2. FIG. 1 shows the comparative example 1 in which one connecting portion 221 is formed. FIG. 2 is a cross-sectional view showing a structure of the tubular unit cell 100.

The comparative example 1 includes a unit cell 100, a first external current collector 210, a second external current collector 220 and a connecting portion 221.

The unit cell 100 is configured to receive fuel reformed from a fuel processor (not shown) and produce electricity through an oxidizing reaction. The unit cell 100 is formed in a tubular shape as shown in FIGS. 1 and 2. In the tubular fuel cell, an anode 130, an electrolyte layer 120, and a cathode 110 are stacked radially from the center axis of the fuel cell. The unit cell 100 is formed as an anode-supported unit cell or cathode-supported unit cell according to its object. In the comparative example 1, the anode 130 is formed in the inside of the anode-supported unit cell 100. However, this embodiment is provided only for purposes of illustration and experiment, and the present invention is not limited to the anode-supported unit cell.

The cathode 110 is formed of a pure electron conductor or mixed conductor, such as a $LaMnO_3$-based or $LaCoO_3$-based material, which has high ion and electron conductivity, stability under an oxygen atmosphere, and no chemical reaction with the electrolytic layer which is described further later herein. The electrolytic layer is a portion that serves as a path along which oxygen ions produced through the cathode and hydrogen ions produced through the anode, which is described further below, are moved. The electrolytic layer may be made of a ceramic material having a density such that gas does not penetrate the ceramic material. The anode 130, in one embodiment, is made of a ceramic material such as YSZ. In one embodiment, a metal ceramic complex (cermet), such as NiO-8YSZ or Ni-8YSZ, is used as the anode 130. Here, the metal ceramic complex (cermet) has a low cost and stability under a high-temperature reduction atmosphere.

Figure 3:
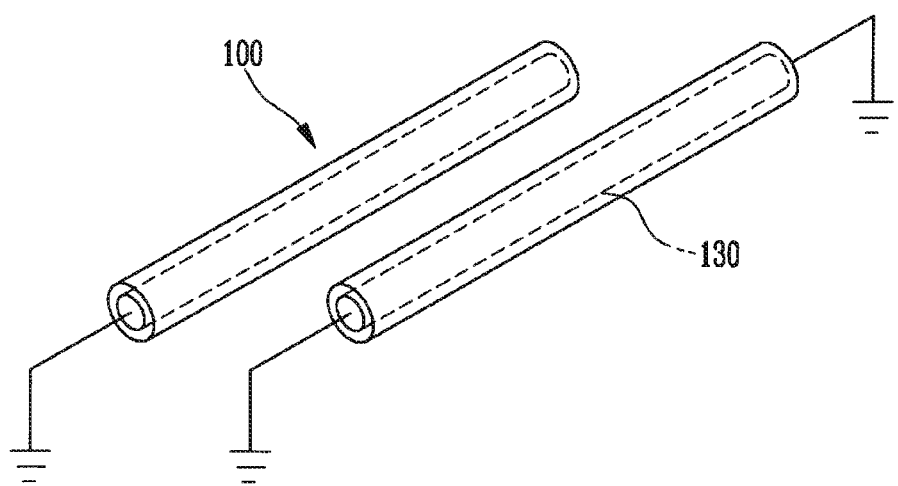
FIG. 3 is a schematic view showing configurations of a unidirectional anode-supported unit cell and a bidirectional anode-supported unit cell.

The internal current collector 142 is formed inside of the anode 130, as shown in FIG. 2. The internal current collector 142 collects current in the inside of the anode 130. As shown in FIG. 3, the internal current collector 142 is divided into a unidirectional anode and a bidirectional anode according to the number of connecting portions. In the unidirectional anode, a connecting portion connected to the outside of the unit cell 100 is formed at only one end of the anode 130 of the unit cell 100. In the bidirectional anode, connecting portions connected to the outside of the unit cell 100 are formed at both ends of the anode 130.

In one embodiment, the unit cell 100 may further include a felt layer 141 interposed between the anode 130 and the internal current collector 142. In this case, the felt layer 141 is formed of a porous member so as to allow fuel to pass therethrough and serve as a current collector for improving current collecting efficiency. In one embodiment, the porous metal felt layer 141 may contain a large amount of nickel (Ni) such that the current collecting efficiency is improved. In one embodiment, a support tube 143 may be further provided at the inside of the internal current collector 142. The support tube 143 may be formed of SUS steel or the like so as to support the entire structure of the unit cell 100, to form a flow path of reforming fuel, and to allow the internal current collector 142 to be adhered closely to the anode 130 or the felt layer 141.

The external current collectors 210 and 220 will be described with reference to FIG. 1. The external current collectors 210 and 220 are formed on the outer circumferential surface of the unit cell 100 so as to collect current. The external current collectors 210 and 220 may be physically provided as one current collector. However, in the comparative example 1, the external current collectors 210 and 220 are divided into the first external current collector 210 and the second external current collector 220. The comparative example 1 is provided for purposes of illustration and experiment; however, embodiments of the present invention are not limited to the shape and number of current collectors.

As shown in FIG. 1, the second external current collector 220 is formed in the lengthwise direction of the unit cell 100 on the outer circumferential surface of the unit cell. The connecting portion 221 for connecting the unit cell 100 to an adjacent unit cell is provided to (e.g., extending from an end of) the second external current collector 220. In the comparative example 1, two connecting portions 221 are formed at one end of the unit cell 100 such that the unit cell 100 can be connected to two adjacent unit cells. The first external current collector 210 surrounds the outside of the second external current collector 220 and is provided in such a manner that the first external current collector 210 is wound along the outer circumferential surface of the unit cell 100.

The internal current collector 142 (see FIG. 2) and the external current collectors 210 and 220 may be formed of wires made of nickel (Ni) or silver (Ag), for example.

Figure 4:
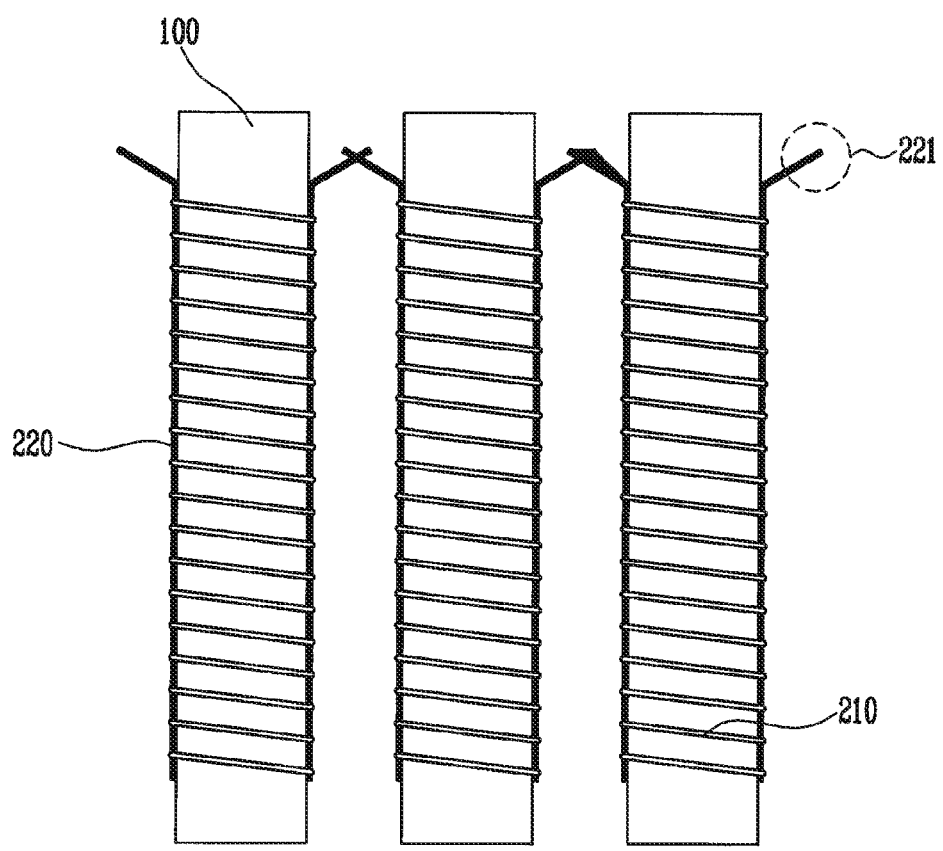
FIG. 4 is a schematic view showing a connection state when the number of connecting portions of the external current collector is one.

The connection method between unit cells in the comparative example 1 is described further with reference to FIG. 4. In the comparative example 1, two adjacent unit cells 100 are connected to each other through one connecting portion 221 of the two adjacent unit cells 100. A voltage drop caused by external current collectors was measured in the state that the plurality of unit cells are connected as described above.

Figure 5:
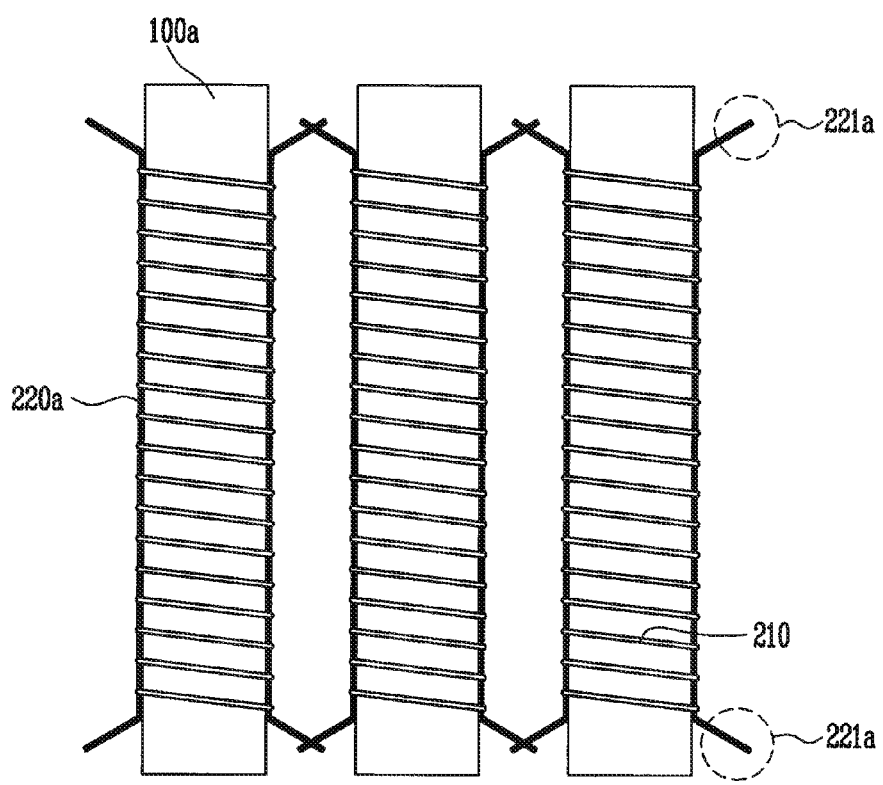
FIG. 5 is a schematic view showing a connection state when the number of connecting portions of the external current collector is two.

An embodiment 1-a according to the present invention is described with reference to FIG. 5. FIG. 5 is a schematic view showing a connection state of the embodiment 1-a.

A unit cell 100a of the embodiment 1-a is different from the comparative example 1 in that, in the unit cell 100a, two connecting portions 221a are provided to (e.g., are extending from) a second external current collector 220a. The connecting portions 221a are formed at both ends of the unit cell 100a. Other components in the embodiment 1-a are the same as those in the comparative example 1.

In the embodiment 1-a, two adjacent unit cells 100a are connected to each other through the two connecting portions 221a provided at both ends of the unit cells 100a. As shown in FIG. 5, a first one (shown in the middle) of the two adjacent unit cells 100a may be connected to a second one (shown on the left) of the two adjacent unit cells 100a through the connecting portions 221a of a first wire of the second external current collector 220a extending in the lengthwise direction on a first side of the outer circumferential surface of the unit cell 100a. A voltage drop caused by external current collectors was measured in the state that the plurality of unit cells 100a are connected as described above. Further, as shown in FIG. 5, the first one (shown in the middle) of the two adjacent unit cells 100a may be connected to another adjacent unit cell 100a (shown on the right) through the connecting portions 221a of a second wire of the second external current collector 220a extending in the lengthwise direction on a second side of the outer circumferential surface of the unit cell 100a.

Figures 6, 7:
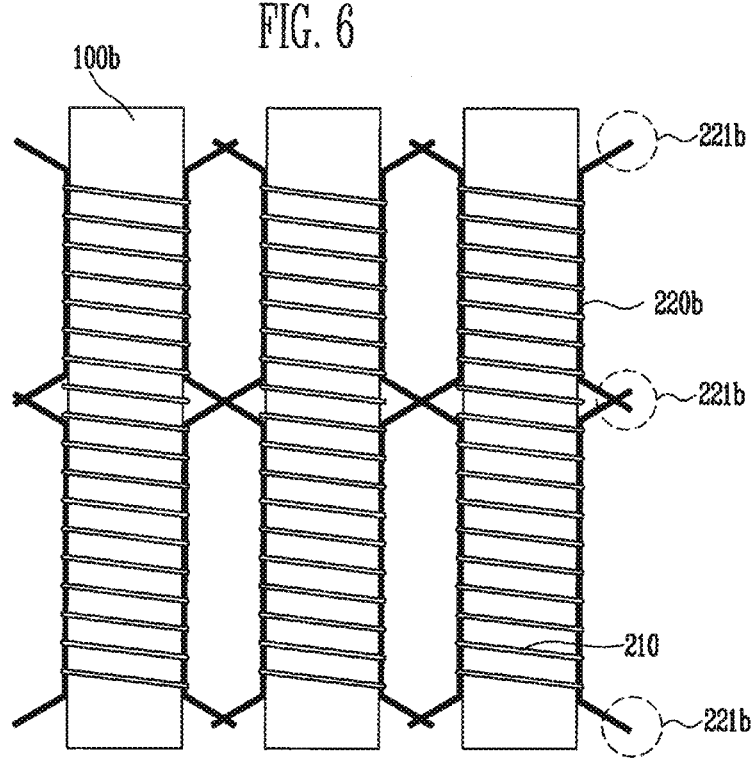
FIG. 6 is a schematic view showing a connection state when the number of connecting portions of the external current collector is three.
FIG. 7 is a table showing voltage drops according to the number of connecting portions of internal and external current collectors of a unit cell having a length of 30 cm.

An embodiment 2-a according to the present invention is described with reference to FIG. 6. FIG. 6 is a schematic view showing a connection state of the embodiment 2-a.

A unit cell 100b of the embodiment 2-a is different from the comparative example 1 in that, in the unit cell 100b, three connecting portions 221b are provided to (e.g., are extending from) a second external current collector 220b. The connecting portions 221b are formed at both ends and a central portion of the unit cell 100b. Other components in the embodiment 2-a are the same as those in the comparative example 1. In one embodiment, a distance between the connecting portions 221b is formed constant. In the case where the distance between the connecting portions 221b is constant, it is easy to estimate the output of the embodiment 2-a or the unit cell 100b having a plurality of connecting portions, and it is easy to design the output of the entire stack.

In the embodiment 2-a, two adjacent unit cells 100b are connected with one another through the three connecting portions 221b respectively provided to both the ends and the central portion of the unit cells 100b. As shown in FIG. 6, a first one (shown in the middle) of the two adjacent unit cells 100b may be connected to a second one (shown on the left) of the two adjacent unit cells 100b through the connecting portions 221b of at least one first wire of the second external current collector 220b extending in the lengthwise direction on a first side of the outer circumferential surface of the unit cell 100b. A voltage drop caused by external current collectors was measured in the state that the plurality of unit cells 100b are connected as described above. Further, as shown in FIG. 6, the first one (shown in the middle) of the two adjacent unit cells 100b may be connected to another adjacent unit cell 100b (shown on the right) through the connecting portions 221b of at least one second wire of the second external current collector 220b extending in the lengthwise direction on a second side of the outer circumferential surface of the unit cell 100b.

As described above, experiments of measuring voltage drops were performed in the comparative example 1, the embodiment 1-a and the embodiment 2-a according to the number of connecting portions between adjacent unit cells 100, and the results are shown in the table of FIG. 7. The unit of measurement of the values shown in the table is microvolts ($\mu V$), and the numbers shown in the "Remark" column denote differences in voltage drop between the comparative example 1 and the embodiment 2-a (and an embodiment 2-b, described below), as a percentage of the voltage drop of the comparative example. In the comparative experiment 1, the length of the unit cell in each of the comparative example 1, the embodiment 1-a, and the embodiment 2-a was set to 30 cm.

According to FIG. 7, in the bidirectional anode-supported (Bidir.) unit cell, the voltage drop of the comparative example 1, in which the number of connecting portions was one, was 3.821 $\mu V$, and the voltage drop of the embodiment 1-a, in which the number of connecting portions was two, was 1.978 $\mu V$. The voltage drop of the embodiment 2-a, in which the number of connecting portions was three, was 1.974 $\mu V$. As the measured result, the voltage drop decreases as the number of connecting lines between adjacent unit cells, i.e. the number of connecting portions, increases.

Particularly, in the embodiment 1-a in which the connecting portions are formed at both the ends of the unit cell, the decrease in voltage drop was sharply made as compared with the comparative example 1. The difference in voltage drop between the comparative example 1 and the embodiment 2-a was about 48%. The voltage drop of the comparative example 1 is greatest because the movement distance of collected electrons is longest in the comparative example 1. In the embodiments 1-a and 2-a, the movement distances of collected electrons are decreased to ½ and ¼ of the longest distances, respectively, and accordingly, resistance is decreased. Therefore, the voltage drops of the embodiments 1-a and 2-a are decreased.

In a fuel cell using the connection method of the embodiments 1-a and 2-a, a voltage drop is slightly increased, and the current collecting function can be maintained even though a disconnection occurs at a portion of the external current collector. Particularly, in the embodiment 2-a, a minimized or reduced voltage drop is achieved even if a disconnection occurs at any one connecting portion for a reason such as mechanical aging.

<Comparative Experiment 2>

Next, the experiment of a unidirectional anode-supported unit cell in which a connecting portion is formed at one end of the anode was performed. Other components are the same as those of the comparative experiment 1. The length of the unit cell is 30 cm, which is the same as the comparative example 1. The experiment was performed by being divided into a comparative example 2, an embodiment 1-b, and an embodiment 2-b according to the number of lines formed at the cathode, i.e. the number of connecting portions, as described above with respect to the comparative experiment 1. The result of the comparative example 2 is shown together with data of the comparative experiment 1 in FIG. 7.

According to FIG. 7, in the unidirectional anode-supported (Unidir.) unit cell, the voltage drop of the comparative example 2, in which the number of connecting portions was one, was 23.36 μV, and the voltage drop of the embodiment 1-b, in which the number of connecting portions was two, was 12.54 μV. The voltage drop of the embodiment 2-b, in which the number of connecting portions was three, was 12.53 μV. As the measured result, the voltage drop decreases as the number of connecting lines between adjacent unit cells, i.e. the number of connecting portions, increases, similar to the comparative experiment 1. The difference in voltage drop between the comparative example 2 and the embodiment 2-b was about 46%.

However, it can be seen that the absolute voltage drop in the unidirectional anode-supported unit cell is about six times greater than that in the bidirectional anode-supported unit cell. Thus, the voltage drop can be effectively decreased using the bidirectional anode-supported unit cell.

<Comparative Experiment 3>

Figures 8, 9:
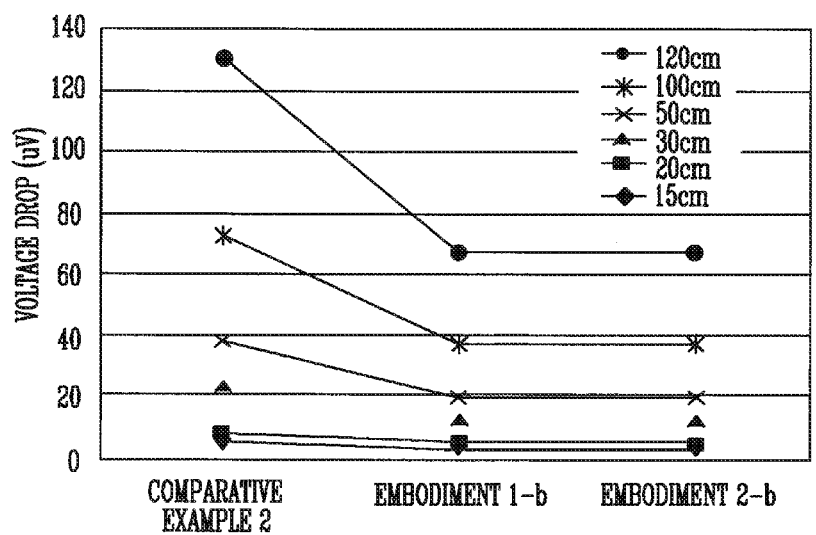
FIG. 8 is a table showing voltage drops according to the length of the unidirectional anode-supported unit cell and the number of connecting portions of an external current collector made of Ag.
FIG. 9 is a graph showing voltage drops according to the length of the unidirectional anode-supported unit cell and the number of connecting portions of the external current collector made of Ag.
Figures 10, 11:
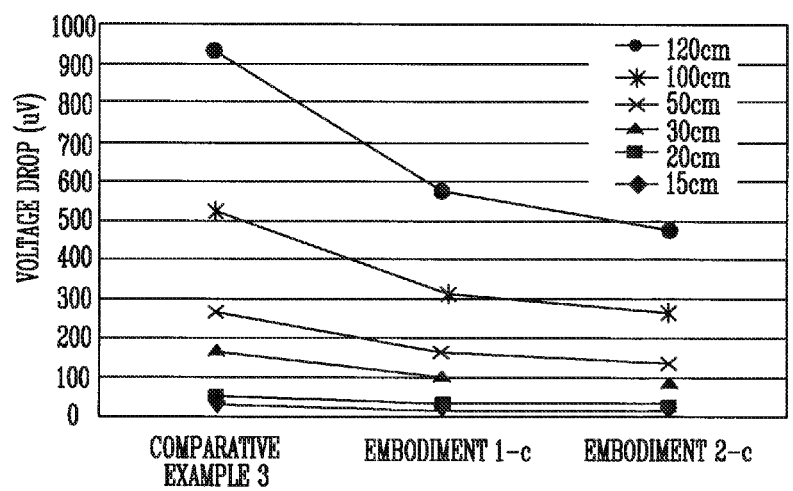
FIG. 10 is a table showing voltage drops according to the length of the unidirectional anode-supported unit cell and the number of connecting portions of an external current collector made of Ni.
FIG. 11 is a graph showing voltage drops according to the length of the unidirectional anode-supported unit cell and the number of connecting portions of the external current collector made of Ni.

Next, the test of the comparative experiment 2 was repeatedly performed while varying the length of the unit cell. That is, the experiment was performed by varying the length of the unidirectional anode-supported unit cell to 15, 20, 30, 50, 100 and 120 cm. In addition, the experiment was performed according to the number of connecting portions provided to the cathode and the material of the external current collector. First, in an experiment group performed using an external current collector formed of an Ag wire, a case in which the number of connecting portions is one is referred to as a comparative example 2, a case in which the number of connecting portions is two is referred to as an example 1-b, and a case in which the number of connecting portions is three is referred to as an example 2-b. In an experiment group performed using an external current collector formed of a Ni wire, a case in which the number of connecting portions is one is referred to as a comparative example 3, a case in which the number of connecting portions is two is referred to as an example 1-c, and a case in which the number of connecting portions is three is referred to as an example 2-c. Data was measured according to each test condition. The results where the external current collector is formed of the Ag wire are shown in FIGS. 8 and 9, and the results where the external current collector is formed of the Ni wire are shown in FIGS. 10 and 11. As described above, the units of measurement of values indicating a voltage drop are microvolts (μV). For convenience, the units of the voltage drop is omitted in some instances in the following description and in the tables. Each number shown in the "Remark" column denotes a difference in voltage drop between the case where the number of connecting portions is one (the comparative example 2 or 3) and the case where the number of connecting portions is two (the embodiment 1-b or 1-c), as a percentage of the voltage drop of the comparative example 2 or 3. The case where the external current collector is formed of the Ag and the case where the external current collector is formed of the Ni will be individually described.

Referring to FIG. 8, in the case where the external current collector was formed of the Ag and the distance between connecting portions was 20 cm, the voltage drop of the comparative example 2 was 7.64 μV, the voltage drop of the embodiment 1-b was 3.96 μV, and the voltage drop of the embodiment 2-b was 3.96 μV. That is, when comparing the embodiment 1-b with the comparative example 2, the difference in voltage drop between the embodiment 1-b and the comparative example 2 was about 48%. Approximately the same difference in voltage drop was shown in the unit cells having different lengths.

However, when comparing the case where the length of the unit cell was 20 cm with the case where the length of the unit cell was 15 cm, in the embodiment 1-b, the difference in voltage drop between these cases was only 1.59 μV. That is, in a case where the length of the unit cell is 20 cm or shorter, the movement distance of electrons is very short, and hence the decrement of the voltage drop is relatively small. Therefore, it is of less value to have a plurality of connecting portions. By contrast, in a case where the distance between connecting portions is 100 cm or greater, the voltage drop is considerably increased. For example, when comparing the case where the length of the unit cell was 100 cm (i.e. the distance between connecting portions is 100 cm) to the case where the length of the unit cell was 120 cm (i.e. the distance between connecting portions is 120 cm), as shown in FIG. 8, the length of the unit cell was increased by 20 cm (i.e. 20%), but the voltage drop was increased by about two times that of the case where the distance between the connecting portions is 100 cm.

In the embodiment 2-b, resultant data is substantially the same as that in the embodiment 1-b. It is considered that the amount of collecting current through a central connecting portion is slight due to several reasons such as repulsion between electrons because the Ag wire with high electrical conductivity is used as the external current collector. That is, in a case where the Ag wire with high electrical conductivity is used as the external current collector, the effect of the embodiment 2-b was slight.

In a case where the Ni wire is used as the external current collector, the voltage drop of the embodiment 1-c was decreased by about 36% to 39% as compared with that of the comparative example 3. However, where the length of the unit cell is 20 cm or shorter in the embodiment 1-c, the absolute voltage drop is small as compared with the unit cell having a greater length. Where the length of the unit cell is 100 cm or longer, the absolute voltage drop is considerably increased. That is, in a case where the length of the unit cell is increased from 100 to 120 cm or longer, it can be seen that the voltage drop is considerably increased from 318.43 μV to 573.17 pV due to the Ni wire with relatively low electrical conductivity. This is because the Ni has an electrical conductivity of about 14% as compared to that of the Ag.

Unlike the case where the Ag wire is used as the external current collector, the voltage drop of the embodiment 2-c is different from that of the embodiment 1-c. Although the difference in voltage drop between the embodiment 2-c and the embodiment 1-c is not greater than that between the embodiment 1-c and the comparative example 3, the voltage drop between the embodiment 2-c and the embodiment 1-c is significant because the unit cell can maintain its function without a large decrease in its performance when a disconnection occurs, as described above.

As described above, in the embodiments 1-a, 1-b, and 1-c, all the voltage drops are decreased when the Ag or Ni wire is used as the external current collector, and the length of the unit cell, in one embodiment, may be from 20 to 100 cm in terms of the absolute voltage drop. In a case where the external current collector is formed of the Ag and the number of connecting portions is two, the decrement of the voltage drop is not large, but the unit cell can perform its function in the state that the voltage drop is not increased so much, even when a disconnection or like occurs under a high-temperature atmosphere. In a case where the external current collector is formed of the Ni wire and the number of connecting portions is three, the voltage drop is significantly decreased as compared with not only the case where the number of connecting portions is one but also the case where the number of connecting portions is two.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A fuel cell comprising:
    a plurality of tubular unit cells each comprising:
        a first electrode layer, an electrolyte layer, and a second electrode layer, stacked radially in a direction from a center axis to an outer region thereof;
        an internal current collector in an interior of the unit cell; and
        an external current collector arranged at an outer circumferential surface of the unit cell, the external current collector comprising at least one first wire extending along a lengthwise direction of the center axis on a first side of the outer circumferential surface and including a plurality of first connecting portions defined by respective end portions of the at least one first wire, and at least one second wire extending along the lengthwise direction on a second side of the outer circumferential surface and including a plurality of second connecting portions defined by respective end portions of the at least one second wire, each of the first connecting portions and the second connecting portions being configured to electrically connect between the unit cell and at least one another unit cell of the plurality of unit cells,
    wherein the first connecting portions of the at least one first wire of a first unit cell of the plurality of unit cells are connected to the second connecting portions of a second unit cell of the plurality of unit cells to form electrical paths therebetween, and the second connecting portions of the at least one second wire of the first unit cell of the plurality of unit cells are connected to the first connecting portions of a third unit cell of the plurality of unit cells to form electrical paths therebetween.

2. The fuel cell according to claim 1, wherein the internal current collector comprises connecting portions arranged at both ends of the unit cell.

3. The fuel cell according to claim 1, wherein the first connecting portions of the external current collector are spaced apart from each other along the lengthwise direction, and the second connecting portions of the external current collector are spaced apart from each other along the lengthwise direction.

4. The fuel cell according to claim 1, wherein the first connecting portions of the external current collector are arranged at both ends of the unit cell, and the second connecting portion of the external current collector are arranged at both ends of the unit cell.

5. The fuel cell according to claim 4, wherein the internal current collector comprises connecting portions arranged at both ends of the unit cell.

6. The fuel cell according to claim 4, wherein the external current collector comprises a metal including at least one of nickel (Ni) or silver (Ag).

7. The fuel cell according to claim 4, wherein a distance between the first connecting portions of the external current collector is 20 cm to 100 cm, and a distance between the second connecting portions of the external current collector is 20 cm to 100 cm.

8. A fuel cell comprising:
    a plurality of tubular unit cells each comprising:
        a first electrode layer, an electrolyte layer, and a second electrode layer, stacked radially in a direction from a center axis to an outer region thereof;
        an internal current collector in an interior of the unit cell; and
        an external current collector arranged at an outer circumferential surface of the unit cell, the external current collector comprising at least one first wire extending along a lengthwise direction of the center axis on a first side of the outer circumferential surface and including a plurality of first connecting portions defined by respective end portions of the at least one first wire, and at least one second wire extending along the lengthwise direction on a second side of the outer circumferential surface and including a plurality of second connecting portions defined by respective end portions of the at least one second wire, each of the first connecting portions and the second connecting portions being configured to electrically connect between the unit cell and at least one another unit cell of the plurality of unit cells, the plurality of first connecting portions including connecting portions of the first connecting portions arranged at both ends of the unit cell and another connecting portion of the first connecting portions arranged at a central portion of the unit cell, and the plurality of second connecting portions including connecting portions of the second connecting portions arranged at both ends of the unit cell and another connecting portion of the second connecting portions arranged at the central portion of the unit cell,
    wherein the first connecting portions of the at least one first wire of a first unit cell of the plurality of unit cells are connected to the second connecting portions of a second unit cell of the plurality of unit cells to form electrical paths therebetween, and the second connecting portions of the at least one second wire of the first unit cell of the plurality of unit cells are connected to the first connecting portions of a third unit cell of the plurality of unit cells to form electrical paths therebetween.

9. The fuel cell according to claim 8, wherein the internal current collector comprises connecting portions arranged at both ends of the internal current collector.

10. The fuel cell according to claim 8, wherein the external current collector comprises a metal including nickel (Ni).

11. The fuel cell according to claim 10, wherein a length of the unit cell comprising the external current collector is 20 cm to 100 cm.

* * * * *